United States Patent
Bidner et al.

(10) Patent No.: US 9,631,629 B2
(45) Date of Patent: Apr. 25, 2017

(54) METHODS AND SYSTEMS FOR LOW-PRESSURE EXHAUST GAS RECIRCULATION

(71) Applicant: Ford Global Technologies, LLC, Dearborn, MI (US)

(72) Inventors: David Karl Bidner, Livonia, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 593 days.

(21) Appl. No.: 14/160,156

(22) Filed: Jan. 21, 2014

(65) Prior Publication Data

US 2015/0071759 A1    Mar. 12, 2015

Related U.S. Application Data

(60) Provisional application No. 61/876,595, filed on Sep. 11, 2013.

(51) Int. Cl.
| | |
|---|---|
| *F04D 27/02* | (2006.01) |
| *F04D 25/02* | (2006.01) |
| *F02C 6/12* | (2006.01) |

(52) U.S. Cl.
CPC ............ *F04D 27/0207* (2013.01); *F02C 6/12* (2013.01); *F04D 25/024* (2013.01); *F04D 27/0223* (2013.01)

(58) Field of Classification Search
CPC ........... F02M 25/0711; F02M 25/0709; F02M 25/0713; F02M 26/08; F02M 26/10; F02M 26/33; F02M 26/38; F02M 26/23; F02B 37/12; F02B 37/18; F02B 37/013; F02B 37/007; F02B 37/16; F02B 37/001; F02B 33/00; F02B 33/40; F02B 33/446; F02B 29/0406; Y02T 10/121
See application file for complete search history.

(56) References Cited

U.S. PATENT DOCUMENTS

| | | | | |
|---|---|---|---|---|
| 5,069,194 A | * | 12/1991 | Deutschmann | F02B 37/18 123/562 |
| 6,202,414 B1 | * | 3/2001 | Schmidt | F02B 37/007 60/605.2 |
| 6,363,721 B1 | * | 4/2002 | Prenninger | F02B 33/44 123/545 |
| 6,868,840 B2 | * | 3/2005 | Lewallen | F02B 29/0418 123/563 |

(Continued)

*Primary Examiner* — Thai Ba Trieu
*Assistant Examiner* — Shafiq Mian
(74) *Attorney, Agent, or Firm* — Julia Voutyras; McCoy Russell LLP

(57) ABSTRACT

A method for controlling air flow through a compressor recirculation passage, comprising: during a first condition: reducing air flow through the compressor recirculation passage based on a margin, the margin based on a rate of air flow at a compressor inlet, a rate of air flow through the compressor recirculation passage, and a rate of EGR flow. In this way, the CRV recirculation flow may be controlled to be less than the amount that could potentially backflow into an air filter disposed in the air intake passage, thus preventing EGR contained in the CRV recirculation flow from fouling the air filter with soot, oil and water.

16 Claims, 4 Drawing Sheets

(56) References Cited

U.S. PATENT DOCUMENTS

| | | | |
|---|---|---|---|
| 6,917,873 B2* | 7/2005 | Itoyama | F02B 37/007 |
| | | | 123/562 |
| 7,107,761 B2* | 9/2006 | Fukuma | F02M 26/42 |
| | | | 123/568.11 |
| 7,281,378 B2 | 10/2007 | Gu et al. | |
| 7,509,805 B2* | 3/2009 | Karlsson | F02B 37/001 |
| | | | 123/562 |
| 7,703,284 B2* | 4/2010 | Becker | F01N 13/143 |
| | | | 123/562 |
| 2006/0174621 A1* | 8/2006 | Chen | F02B 37/007 |
| | | | 60/612 |
| 2011/0000470 A1 | 1/2011 | Roth | |
| 2011/0079008 A1 | 4/2011 | de Ojeda | |
| 2011/0296831 A1* | 12/2011 | Pursifull | F02B 37/007 |
| | | | 60/602 |
| 2014/0209073 A1* | 7/2014 | Johnson | F02M 25/07 |
| | | | 123/568.12 |

\* cited by examiner

METHODS AND SYSTEMS FOR LOW-PRESSURE EXHAUST GAS RECIRCULATION

CROSS REFERENCE TO RELATED APPLICATION

This application claims priority to U.S. Provisional Patent Application No. 61/876,595, entitled "METHODS AND SYSTEMS FOR LOW-PRESSURE EXHAUST GAS RECIRCULATION," filed Sep. 11, 2013, the entire contents of which are hereby incorporated herein by reference for all purposes.

BACKGROUND AND SUMMARY

Internal combustion engines may utilize recirculation of exhaust gas from an engine exhaust system to an engine intake system, a process referred to as exhaust gas recirculation (EGR), to reduce regulated emissions. In a turbocharged engine including a turbine and a compressor, exhaust may be recirculated through a high-pressure (HP) EGR system and/or a low-pressure (LP) EGR system. In an HP EGR system, exhaust is drawn from upstream of the turbine and is mixed with intake air downstream of the compressor. In an LP EGR system, exhaust is drawn from downstream of the turbine and mixed with intake air upstream of the compressor.

The EGR system may be equipped with a compressor recirculation valve (CRV) contained within a CRV passage. When opened, the CRV may serve to reduce compressor surge during certain conditions by recirculating the intake mixture downstream of the compressor back to the intake passage upstream of the compressor.

However, in engines equipped with LP-EGR systems, CRV, compressor bypass flow will contain EGR, and thus contain carbon soot, oil, and water. High volumes of backflow through the CRV passage may allow the EGR containing air to reach the intake air filter, fouling and causing premature failure of the air filter, particularly for systems with a small volume between the air filter and the compressor. This is of particular concern as engines equipped with LP-EGR systems may operate close to compressor surge conditions, requiring high volumes of backflow during conditions of acceleration or high load immediately followed by sudden deceleration.

The inventors herein have recognized the above issues and have devised numerous approaches to at least partially address them. In one example, a method for controlling air flow through a compressor recirculation passage, comprising: during a first condition: reducing air flow through the compressor recirculation passage based on a margin, the margin based on a rate of air flow at a compressor inlet, a rate of air flow through the compressor recirculation passage, and a rate of EGR flow. In this way, the CRV recirculation flow may be controlled to be less than the amount that could potentially backflow into an air filter disposed in the air intake passage, thus preventing EGR contained in the CRV recirculation flow from fouling the air filter with soot, oil and water.

In another example, a system for an engine, comprising: a turbocharger comprising a compressor arranged in an intake passage and a turbine arranged in an exhaust passage; a low-pressure exhaust gas recirculation (EGR) system including an EGR passage coupling the exhaust passage with the intake passage upstream of the compressor; a compressor recirculation passage coupling the intake passage downstream of the compressor with the intake passage upstream of the compressor; a controller holding instructions to reduce air flow through the compressor recirculation passage based on a margin, the margin based on a rate of air flow at a compressor inlet, subtracting a rate of air flow through the compressor recirculation passage, and further subtracting a rate of EGR flow through the EGR passage. In this way, the system will reduce the amount of EGR containing CRV recirculation flow that may enter the air intake passage, despite engine compartmental restrictions that limit the volume of the air intake. Reducing this amount may allow for use of the EGR system while limiting the concentration of contaminants that may foul an air filter disposed in the air intake passage.

In yet another example, a method for an engine, comprising: during a first condition where a compressor recirculation valvecompressor recirculation valve is open: measuring a rate of an air flow at a compressor inlet; measuring a rate of an air flow through a compressor recirculation passage; measuring a rate of an EGR flow through a low-pressure EGR passage; determining a value for a margin based on current values for the rate of air flow at the compressor inlet, the rate of air flow through the compressor recirculation passage, and the rate of EGR flow through the low-pressure EGR passage; closing the compressor recirculation valve-compressor recirculation valve when the value for the margin is less than a threshold. In this way, air pressure and air/gas flow rates in the air intake and EGR systems of an engine may be continuously monitored and adjusted based on engine operating conditions so as to prevent large volume backflow events that may result in EGR containing gas fouling components disposed in the air intake system, such as an air filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

The following description relates to controlling flow through a compressor recirculation valve passage during the operation of a turbocharged internal combustion engine. As shown in the example embodiment of FIG. 1, an engine system may include two branches, each equipped with a turbocharger and EGR system. As shown in more detail in FIG. 2, each branch may be broken into various segments and sections, with sensors placed in each section for measuring local air and gas flow rates and/or local air and gas pressures. By monitoring local air and gas flow rates and pressures, it may be possible to mitigate fouling of an air filter within the engine by controlling the flow through a compressor recirculation valve passage, as shown by an example method in FIG. 3. FIG. 4 depicts an example timing plot using the method shown in FIG. 3 to control the turbocharged engine of FIGS. 1 and 2.

Figure 1:
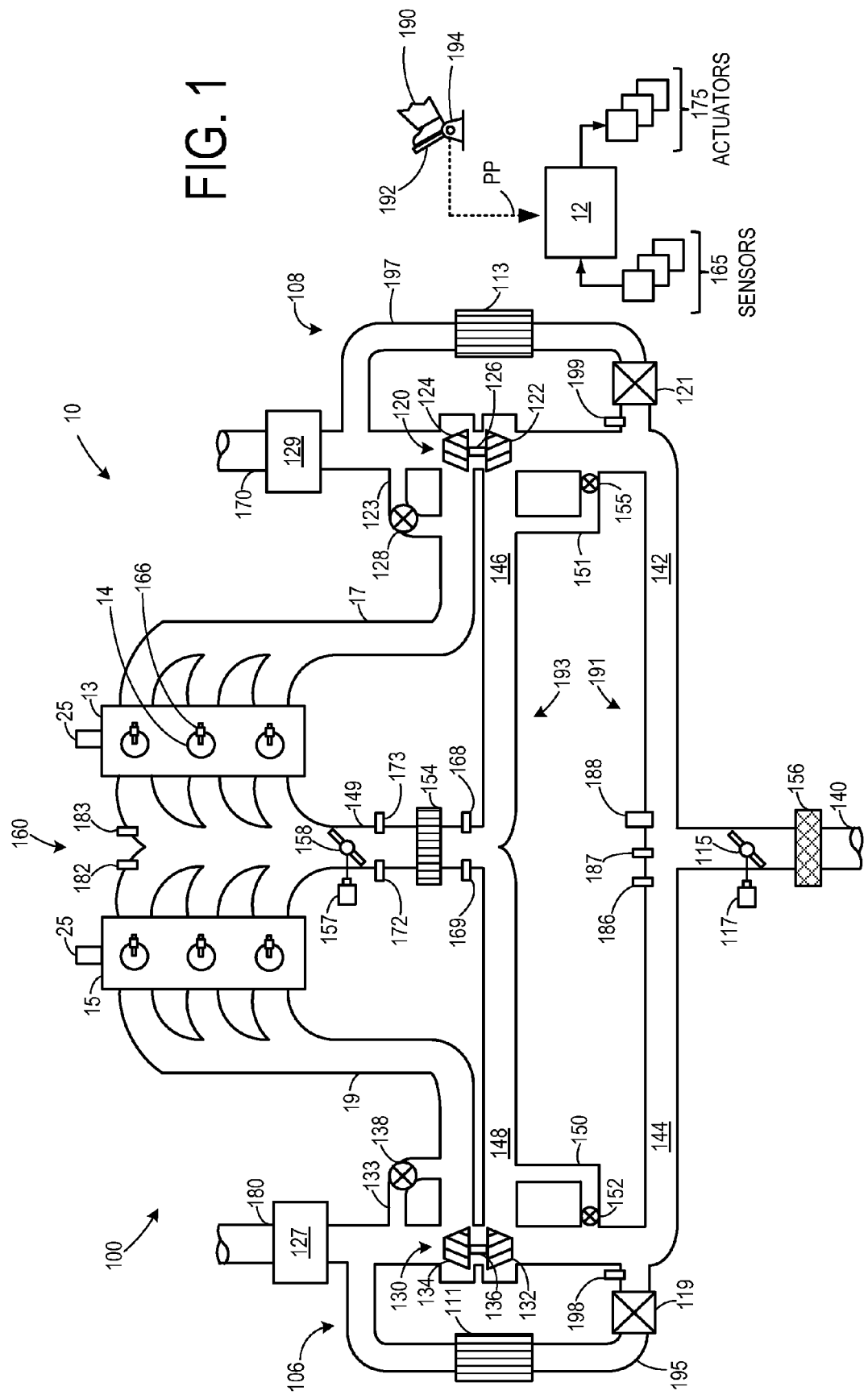
FIG. 1 shows a schematic diagram for a twin-turbocharged engine system including an LP EGR system.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. An example control routine is described below and with regard to FIG. 3.

Engine system 100 may receive intake air via intake passage 140. As shown in FIG. 1, intake passage 140 may include an air filter 156 and an air induction system (AIS) throttle 115. AIS throttle 115 may be configured to adjust and control the amount of LP EGR flow. The position of AIS throttle 115 may be adjusted by the control system via a throttle actuator 117 communicatively coupled to controller 12.

At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144. Accordingly, engine system 100 includes a low-pressure AIS system 191 upstream of compressors 122 and 132, and a high-pressure AIS system 193 downstream of compressors 122 and 132.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown in FIG. 1, a compressor recirculation valve (CRV) 152 may be arranged in CRV passage 150 and a CRV 155 may be arranged in CRV passage 151. In one example, CRVs 152 and 155 may be electronic pneumatic CRVs (EPCRVs). CRVs 152 and 155 may be controlled to enable release of pressure in the intake system when the engine is boosted. A first end of CRV passage 150 may be coupled with intake passage 144 upstream of compressor 132, and a second end of CRV passage 150 may be coupled with intake passage 148 downstream of compressor 132. Similarly, a first end of a CRV passage 151 may be coupled with intake passage 142 upstream of compressor 122, and second end of CRV passage 151 may be coupled with intake passage 146 downstream of compressor 122. Depending on a position of each CRV, air compressed by the corresponding compressor may be recirculated into the intake passage upstream of the compressor (e.g., intake passage 144 for compressor 132 and intake passage 142 for compressor 122). For example, CRV 152 may open to recirculate compressed air upstream of compressor 132 and/or CRV 155 may open to recirculate compressed air upstream of compressor 122 to release pressure in the intake system during selected conditions to reduce the effects of compressor surge loading. CRVs 155 and 152 may be passively controlled, or actively controlled by the control system.

As shown, a LP AIS pressure sensor 186 is arranged at a juncture of intake passages 140, 142, and 144, and an HP AIS pressure sensor 169 is arranged in intake passage 149. However, in other anticipated embodiments, sensors 186 and 169 may be arranged at other locations within the LP AIS and HP AIS, respectively. Among other functions, measurements from LP AIS pressure sensor 186 and HP AIS pressure sensor 169 may be used to determine compressor pressure ratio, which may in factor into an estimate of compressor surge risk.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector. In some examples, both port based and direct in-cylinder injectors may be coupled to the same engine cylinder.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Products of combustion that are exhausted by engine 10 via exhaust passages 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may modulate between air pressures in intake passage 144 arranged upstream of compressor 132 and intake passage 149 arranged downstream of compressor 132 for facilitating the actuation of wastegate 138 via the actuator. In other examples, other suitable approaches other than a solenoid valve may be used for actuating wastegate 138.

Products of combustion exhausted by the cylinders via exhaust passage 19 may be directed to the atmosphere via exhaust passage 170 downstream of turbine 134, while combustion products exhausted via exhaust passage 19 may be directed to the atmosphere via exhaust passage 180 downstream of turbine 124. Exhaust passages 170 and 180 may include one or more exhaust after-treatment devices, such as a catalyst, and one or more exhaust gas sensors. For example, as shown in FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically reset by operating at least one cylinder of the engine within a particular air/fuel ratio, for example.

Engine system 100 further includes low-pressure (LP) EGR systems 106 and 108. LP EGR system 106 routes a desired portion of exhaust gas from exhaust passage 180 to intake passage 144, whereas LP EGR system 108 routes a desired portion of exhaust gas from exhaust passage 170 to intake passage 142. In the depicted embodiment, EGR is routed in an EGR passage 195 from downstream of turbine 134 to intake passage 144 at a mixing point located upstream of compressor 132. Similarly, EGR is routed in an EGR passage 197 from downstream of turbine 124 to intake passage 142 at a mixing point located upstream of compressor 122. The amount of EGR provided to intake passages 144 and 142 may be varied by the controller 12 via EGR valves 119 and 121 coupled in the LP EGR systems 106 and 108, respectively. In the example embodiment shown in FIG. 1, LP EGR system 106 includes an EGR cooler 111 positioned upstream of EGR valve 119, and LP EGR system 108 includes an EGR cooler 113 positioned upstream of EGR valve 121. EGR coolers 111 and 113 may reject heat from the recirculated exhaust gas to engine coolant, for example.

The EGR dilution percentage of the intake charge at a given time (e.g., the proportion of combusted gases to air in an intake passage of the engine) may be inferred from the output of an intake oxygen sensor 168. In the depicted embodiment, the intake oxygen sensor is positioned at a juncture of intake passages 146, 148, and 149 and upstream of air cooler 154. However, in other embodiments, sensor 168 may be arranged downstream of air cooler 154, or at another location along intake passage 149. Intake oxygen sensor 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 119, EGR valve 121, AIS throttle 115, CRV 152, CRV 155, wastegate 138, and wastegate 128 to achieve a desired EGR dilution percentage of the intake charge.

It will be appreciated that in alternative embodiments, engine 10 may include one or more high pressure (HP) EGR systems as well as the LP EGR systems, to divert at least some exhaust gas from the engine exhaust passages, upstream of the turbines, to the engine intake, downstream of the compressors.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Low pressure AIS system 191 may include temperature sensor 187 and/or humidity sensor 188. EGR passage 195 may include temperature sensor 198. Similarly, EGR passage 197 may include temperature sensor 199. Further, while not depicted herein, each of intake passages 142 and 144 can include a mass air flow sensor.

Figure 2:
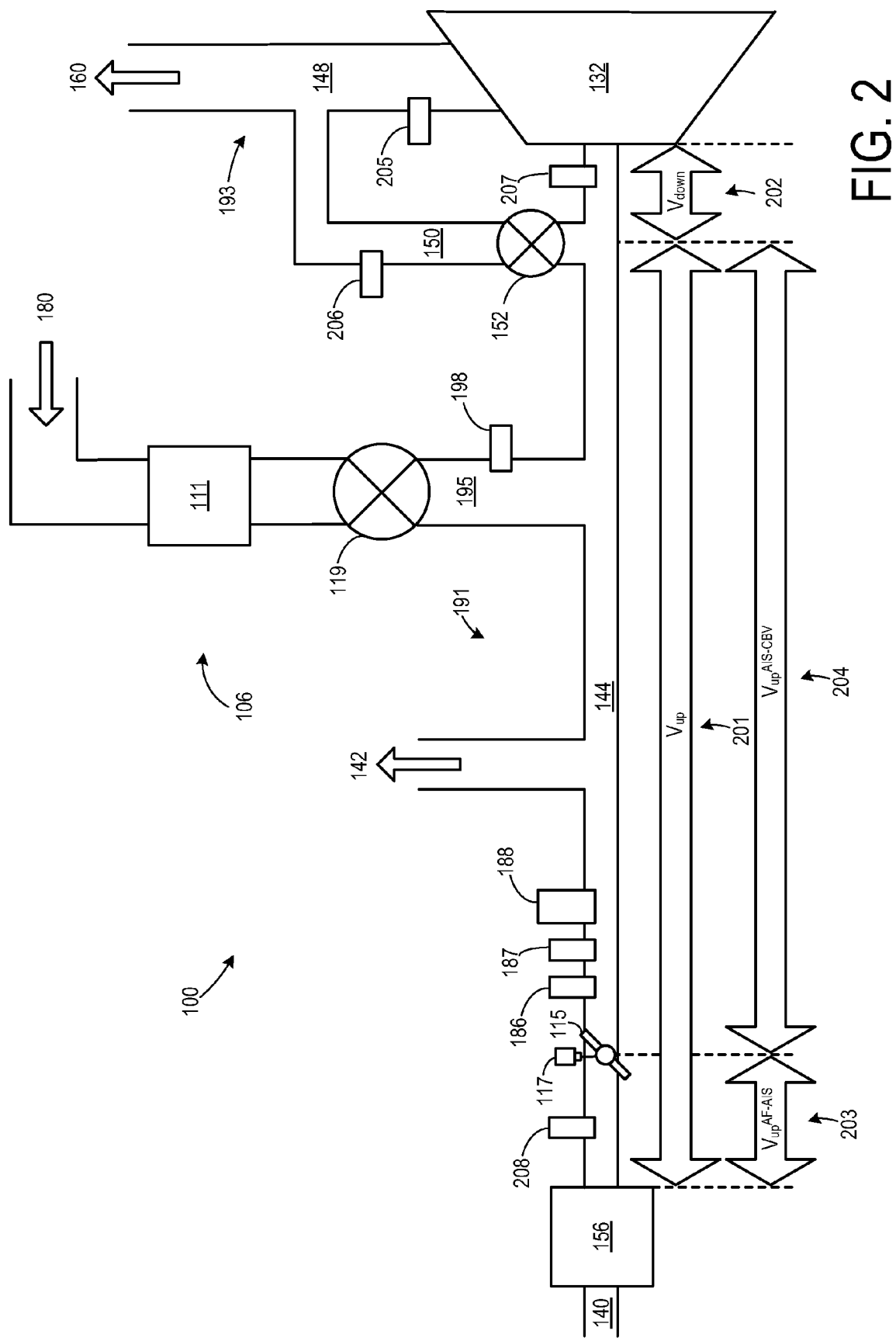
FIG. 2 shows a schematic diagram for a portion of the air intake system of the twin-turbocharged engine system of FIG. 1.

FIG. 2 schematically shows a portion of the air intake system of the twin-turbocharged engine system of FIG. 1. Although only one branch of the air intake system is depicted in detail, it should be understood that the description herein is applicable to both branches.

As shown in FIGS. 1 and 2, the outlet of CRV passage 150 may be located adjacent to the outlet of EGR passage 195 along intake passage 144 of low-pressure AIS system 191. In this configuration, the CRV flow may contain recirculated exhaust gas when the LP-EGR system is active. Under certain conditions, the CRV flow may backflow into intake passage 144. If the volume of the backflow is great enough, the CRV flow may reach air filter 156. The EGR containing backflow includes carbon soot, oil, and water which may thus foul the air filter and may lead to premature failure. For example, a condition of high load or vehicle acceleration followed by sudden deceleration may lead to a high CRV flow rate at the same time the flow rate through the compressor has decreased. The inventors herein have recognized that by monitoring flow rates and pressures upstream and downstream of CRV 152, it may be possible to identify conditions where a backflow event could foul air filter 156 and take action to mitigate the backflow event. An example method for monitoring and controlling flow through a CRV is described herein and with regards to FIG. 3.

As shown in FIG. 2, the intake passage 144 of the low-pressure AIS may be divided into an upstream segment 201 and a downstream segment 202. Upstream segment 201 includes the portion of intake passage 144 between air filter 156 and the inlet of CRV passage 150. Downstream segment 202 includes the portion of intake passage 144 between the inlet of CRV passage 150 and the inlet to compressor 132. Upstream segment 201 may be further divided into a first upstream section 203 and a second upstream section 204. First upstream section 203 includes the portion of intake passage 144 between air filter 156 and AIS throttle 115. Second upstream section 204 includes the portion of intake passage 144 between AIS throttle 115 and the inlet of CRV passage 150.

The volume of downstream segment 202 may be considered constant, and is referred to herein as $V_{down}$. The volume of first upstream section 203 and second upstream section 204 may also be considered constants, and are referred to herein as $V_{up}^{AF-AIS}$ and $V_{up}^{AIS-CRV}$, respectively. The volume of upstream segment 201 may be calculated from $V_{up}^{AF-AIS}$ and $V_{up}^{AIS-CRV}$, and is referred to herein as $V_{up}$. However, the pressure and gas density of the two upstream sections may be different, so equivalent volumes for the two upstream sections may be calculated prior to determining $V_{up}$.

Other sensors may be included in the air intake system so that air and gas pressures and flow rates may be determined at various points upstream and downstream of the CRV. The sensors may be coupled to controller 12 as described for sensors with regards to FIG. 1. Intake passage 148 may include air flow sensor 205, which may be used to measure the air flow downstream of compressor 132. CRV passage 150 may include air flow sensor 206, which may be used to measure flow through the CRV passage. Intake passage 144 may include pressure sensors 207 and 208. Pressure sensor 207 may be coupled to intake passage 144 within downstream segment 202 and may be used to measure air pressure downstream of the CRV. Pressure sensor 208 may be coupled to intake passage 144 within first upstream section 203 and may be used to measure air pressure upstream of AIS throttle 115.

In the example depicted in FIG. 2, there are three potential sources of air/gas flowing into intake passage 144. Air may flow in via air intake passage 140, EGR may flow in via EGR passage 195, and CRV flow may flow in via CRV passage 150. Air/gas may flow out of the second branch via intake passage 142 or via air passage 148 via compressor 132. By continuously monitoring the air/gas flows into and out of the second branch, as well as the air/gas pressures and densities in the various segments and sections of intake passage 144, preventative action may be taken to ensure that CRV backflow events do not contain enough volume to force EGR into air filter 156.

Figure 3:
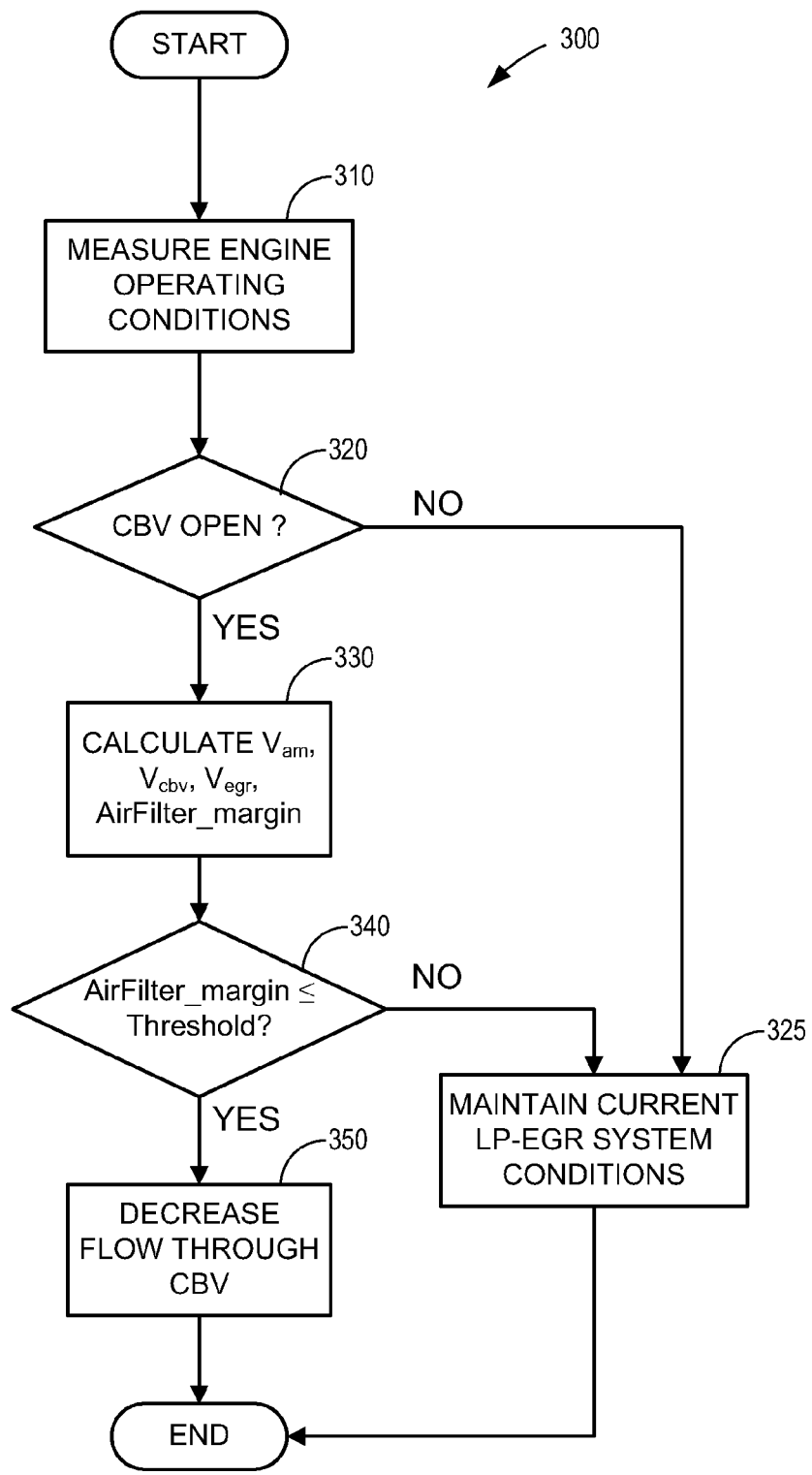
FIG. 3 shows a flow chart for a high-level method for controlling gas flow through a CRV passage.
Figure 4:
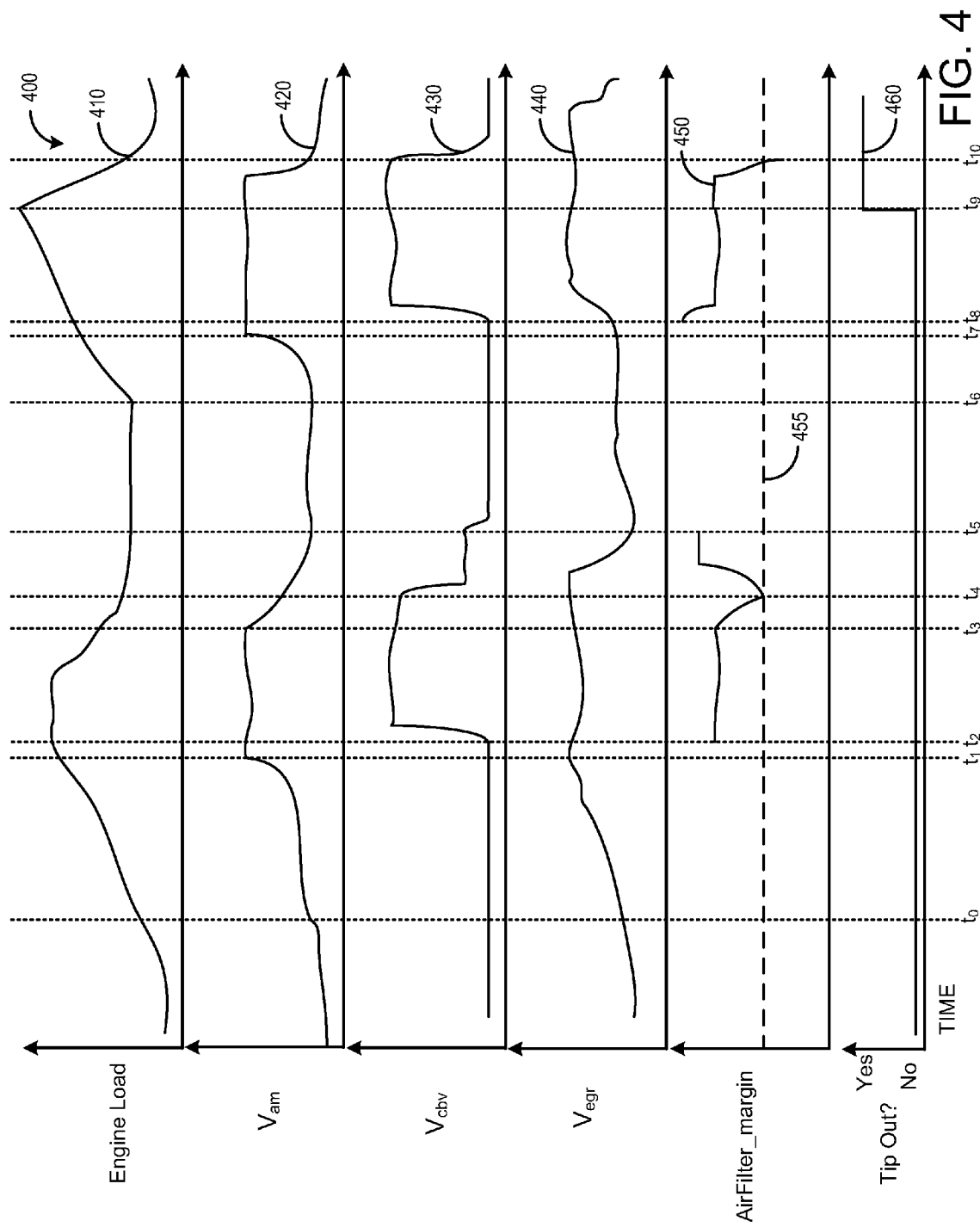
FIG. 4 shows a timing plot for the operation of a turbocharged engine system using the method depicted in FIG. 3.

FIG. 3 shows a flow chart for an example high-level method 300 for controlling an engine system, such as engine system 100 as shown in FIGS. 1 and 2. Method 300 may be configured as computer instructions stored by a control system and implemented by a controller, for example controller 12 as shown in FIG. 1. FIG. 3 will be described in reference to components and features of the example engines detailed in FIGS. 1 and 2, but it should be recognized that method 300 or other equivalent methods may be performed with respect to a plurality of engine configurations without departing from the scope of this disclosure. It will be appreciated that in an engine system with twin turbochargers, such as engine system 100 of FIG. 1, method 300 may be performed at both branches of the intake system, or at only one branch.

Method 300 may begin at 310 by measuring or estimating engine operating conditions. As non-limiting examples, the operating conditions may include ambient temperature and pressure, boost, EGR valve position, intake oxygen concentration in the LP AIS system, pedal position (PP), engine speed, engine load, engine temperature, etc.

Continuing at 320, method 300 may include determining whether CRV 152 is open. In some examples, method 300 may begin upon opening of the CRV, so as to provide continuous monitoring of conditions. In some examples, method 300 may also determine whether a tip-out condition is met, and may only proceed if both the CRV is open and the tip-out condition is met. In the example depicted in FIG. 3, if the CRV is closed, method 300 may proceed to 325. At 325, method 300 may include maintaining the current conditions of the LP-EGR system or systems.

If the CRV is open, method 300 may proceed to 330. At 330, method 300 may include calculating values for the variables $V_{am}$, $V_{CRV}$, $V_{egr}$, and AirFilter_margin. The values may be calculated using measurements from air flow and air pressure sensors as described with regards to FIG. 2. The values may be calculated repeatedly, and updated to reflect the most current engine operating conditions while the CRV remains open.

$V_{am}$ is a variable representing the volume of air flow into compressor 132, and may be calculated by integrating the air flow into compressor 132 over time. $V_{CRV}$ is a variable representing the volume of air flow through CRV passage 150, and may be calculated by integrating the flow of gas through CRV 152 upstream of the compressor over time. $V_{egr}$ is a variable representing the volume of EGR flow through EGR passage 195, and may be calculated by integrating the flow of EGR through EGR passage 195 over time.

AirFilter_margin is a variable representing the capacity of the air induction system to accept CRV backflow without fouling the air filter based on current operating conditions. AirFilter_margin may be calculated with the equation:

$$\text{AirFilter\_margin} = V_{up} - V_{CRV} - V_{egr} + V_{am}$$

In other words, AirFilter_margin represents the sum of the volume of intake passage 144 upstream of CRV 152 and the volume of air flow into compressor 132 minus the volume of CRV flow and EGR flow into intake passage 144.

Continuing at 340, method 300 may include determining whether AirFilter_margin, as calculated at 330 is less than or equal to a threshold. The threshold may be predetermined, or may be calculated based on current operating conditions. If AirFilter_margin is determined to be greater than the threshold, method 300 may proceed to 325. At 325, method 300 may include maintaining the current conditions of the LP-EGR system or systems.

If AirFilter_margin is determined to be less than or equal to the threshold, method 300 may proceed to 350. At 350, method 300 may include taking an action to decrease the flow through the CRV. This may include partially or completely closing the CRV. Reducing the CRV flow while the compressor is active may induce compressor surge conditions. As such, the likelihood of compressor surge may be calculated and if a continuously variable CRV is employed, method 300 may further include calculating a reduction of CRV flow such that compressor surge is avoided.

In some embodiments, method 300 may include other mechanisms for increasing the capacity of the air induction system. In some scenarios, it may be possible to reduce the amount of EGR flowing into intake passage 144, for example by partially or completely closing EGR valve 119.

In some embodiments, method 300 may include mechanisms for limiting boost based on engine operating conditions. Increased boost may lead to increased CRV flow, which in turn may lead to air filter fouling during CRV backflow. Boost may be limited in a feed-back or feed-forward mechanism. For example, boost may be limited in back-out or crowd-out conditions in an attempt to limit CRV flow. Boost may also be limited prior to CRV backflow events, or under certain conditions following CRV backflow events, for example, if method 300 as depicted in FIG. 3 is unsuccessful at preventing an air filter fouling event, or if limiting CRV flow alone is insufficient at preventing air filter fouling events.

In some embodiments, method 300 may include mechanisms for balancing noise, vibration, and harshness (NVH) associated with compressor surge with control of CRV flow. In some examples, NVH may be preferable to CRV backflow that leads to air filter fouling events. Both NVH events and air filter fouling events may be considered accumulation failures. The history of such failures, cost of future failures, and progression towards component failure may be evaluated and implementation of method 300 may be further based on past, current, or future failure events. In some embodiments, the relative weighting of NVH events and air filter events may be based on the presence or absence of engine components not shown in FIGS. 1 and 2, such as resonators and/or acoustic tuning dimensions which mitigate NVH events, and/or compressor turbine blade designs or diffuser designs that reduce NVH levels. In embodiments where NVH events are prevented or attenuated based on air/EGR passage designs or components, method 300 may favor air/EGR flow conditions which would otherwise produce unwanted NVH events, or would otherwise lead to air filter fouling events as a preferred option to NVH events.

Method 300 may include calculating values for AirFilter$_{13}$ Margin based on the details of the respective system in which it is implemented. As AirFilter_Margin increases or decreases for the respective system, the strategy may be modified to allow a greater or smaller amount of CRV backflow volume. For example, engines and/or engine bays may trend towards smaller volumes, more confined layouts, or have shorter distances between components. CRV, EGR, and/or PCV port locations may be altered from the configurations depicted in FIGS. 1 and 2, leading to more or less EGR entering the CRV flow. Air filter service durations may be extended as new air filter components are developed, enabling longer service durations and more air filter fouling events leading to air filter failures.

In some embodiments, method 300 may be adapted to be applied to high-pressure EGR systems, other systems that introduce EGR upstream of the compressor or within the CRV flow. In some embodiments, method 300 may be adapted to be applied to limit backflow from late intake valve closing. For example, method 300 may include mechanisms to limit CRV flow on the bases of late intake valve closing. In some embodiments, CRV flow may be limited based on the timing of late intake valve closing. For example, CRV flow may be more limited as intake valve closing becomes later.

The method shown in FIG. 3 may enable one or methods. In one example, a method for controlling air flow through a compressor recirculation passage, comprising: during a first condition: reducing air flow through the compressor recirculation passage based on a margin, the margin based on a rate of air flow at a compressor inlet, a rate of air flow through the compressor recirculation passage, and a rate of EGR flow. In some embodiments, reducing air flow through the compressor recirculation passage includes closing a compressor recirculation valve coupled to the compressor recirculation passage. The first condition may include a compressor recirculation valve open condition, and/or a tip-out condition. The margin may be further based on a volume of an air intake passage that is upstream of the compressor recirculation passage. The margin may be further based on a pressure in a first section of the air intake passage and a pressure in a second section of the air intake passage, the first and second sections separated by an air intake throttle. Reducing air flow through the compressor recirculation passage based on a margin may include reducing air flow through the compressor recirculation passage when the margin is less than a threshold, and may further include reducing air flow through the compressor recirculation passage until the margin increases above the threshold.

The technical result of implementing this method is the prevention of EGR contained in the CRV recirculation flow from fouling an air filter disposed within the air intake passage with soot, oil and water. The method allows for the CRV recirculation flow to be controlled being less than the amount that could potentially backflow in to the air filter.

FIG. 4 depicts a graphical representation of timeline 400 for engine operation and for the operation of a compressor recirculation valve. Timeline 400 may represent the operation of a turbocharged engine system, such as system 100 depicted in FIGS. 1 and 2 using method 300 as depicted in FIG. 3. Timeline 400 will be described herein with regards to components and elements of FIGS. 1-3, but it should be understood that other configurations are possible without departing from the scope of this disclosure. Timeline 400 includes graphical representation of current engine load, shown by line 410. Timeline 400 further includes graphical representation of integrated air flow into a compressor ($V_{am}$), shown by line 420. Timeline 400 further includes graphical representation of integrated flow through a compressor recirculation valve passage ($V_{CRV}$), as shown by line 430. Timeline 400 further includes graphical representation of integrated flow through an exhaust gas recirculation passage ($V_{egr}$), as shown by line 440. Timeline 400 further includes graphical representation of calculated variable AirFilter_margin, as described with regards to FIG. 3, and as shown by line 450. Timeline further depicts a AirFilter_margin threshold 455. For example, threshold 455 may be the threshold discussed above with regards to 340 depicted in FIG. 3. Timeline 400 further includes graphical representation of a tip out condition, as shown by line 460. For the purposes of simplicity, $V_{up}$, as described with regards to FIG. 2 and a component of AirFilter_margin, is considered to be constant throughout timeline 400, and is thus not shown.

At time $t_0$, CRV 152 is closed, and as such $V_{CRV}$ is 0, as shown by line 430. As described with regards to 320 depicted in FIG. 3, the status of the LP-EGR system is thus maintained, and a value for AirFilter_margin is not calculated. From time $t_0$ to time $t_1$, engine load progressively increases, as shown by line 410. As engine load increases, flows into the compressor and through the EGR passage increase, as shown by lines 420 and 440, respectively. From time $t_1$ to time $t_2$, engine load continues to increase, but airflow into the compressor remains relatively constant. As such, at time $t_2$, CRV 152 is opened to prevent against compressor surge. Controller 12 may then calculate a value for AirFilter_margin based on $V_{am}$, $V_{CRV}$, $V_{egr}$, and $V_{up}$. As shown by line 450, AirFilter_margin is greater than threshold 455 from $t_2$ to $t_3$, and thus no further action is taken.

From time $t_3$ to time $t_4$, engine load is decreasing, as shown by line 410. In response, the compressor speed decreases and $V_{am}$ decreases accordingly, as shown by line 420. However, $V_{egr}$ and $V_{CRV}$ remain relatively constant, as shown by lines 440 and 430, respectively. As such, the value of AirFilter_margin decreases below threshold 455 at time $t_4$, as shown by line 450. In response to the value of AirFilter_margin decreasing below threshold 455, the CRV is partially closed at time $t_4$, decreasing $V_{CRV}$, and returning the value of AirFilter_margin to above threshold 455. At time $t_5$, compressor inlet flow has decreased to the point where opening the CRV is no longer necessary. The CRV is thus shut, allowing compressor surge to occur, and a value for AirFilter_margin no longer needs to be calculated.

At time $t_6$, CRV 152 is closed, and as such $V_{CRV}$ is 0, as shown by line 430. As described with regards to 320 depicted in FIG. 3, the status of the LP-EGR system is thus maintained, and a value for AirFilter_margin is not calculated. From time $t_6$ to time $t_7$, engine load progressively increases, as shown by line 410. As engine load increases, flows into the compressor and through the EGR passage increase, as shown by lines 420 and 440, respectively. From time $t_7$ to time $t_8$, engine load continues to increase, but airflow into the compressor remains relatively constant. As such, at time $t_8$, CRV 152 is opened to prevent against compressor surge. Controller 12 may then calculate a value for AirFilter_margin based on $V_{am}$, $V_{CRV}$, $V_{egr}$, and $V_{up}$. As shown by line 450, AirFilter_margin is greater than threshold 455 from $t_8$ to $t_9$, and thus no further action is taken.

At time $t_9$, a tip out condition is met, as shown by line 460, and engine load decreases significantly, as shown by line 410. Flow into the compressor is then decreased, as shown by line 420. Accordingly, AirFilter_margin decreases below threshold 455 at time $t_{10}$. In response to the value of AirFilter_margin decreasing below threshold 455, the CRV is closed completely, and a value for AirFilter_margin no longer needs to be calculated.

The systems depicted in FIGS. 1 and 2 and the method shown in FIG. 3 may enable one or more systems. In one example, a system for an engine, comprising: a turbocharger comprising a compressor arranged in an intake passage and a turbine arranged in an exhaust passage; a low-pressure exhaust gas recirculation (EGR) system including an EGR passage coupling the exhaust passage with the intake passage upstream of the compressor; a compressor recirculation passage coupling the intake passage downstream of the compressor with the intake passage upstream of the compressor; a controller holding instructions to reduce air flow through the compressor recirculation passage based on a margin, the margin based on a difference between a rate of air flow at a compressor inlet and the sum of a rate of air flow through the compressor recirculation passage plus a rate of EGR flow through the EGR passage. The system may further comprise a compressor recirculation valve (CRV) arranged in the compressor recirculation passage, and reducing air flow through the compressor recirculation passage may include closing the compressor recirculation valve. Reducing air flow through the compressor recirculation passage based on a margin may include reducing air flow through the compressor recirculation passage when the margin is less than a threshold. The controller may further hold instructions to reduce air flow through the compressor recirculation passage until the margin increases above the threshold. The margin may be further based on a volume of the intake passage that is upstream of the compressor recirculation passage. The intake passage may further comprise an air intake throttle. The margin may be further based on a pressure in a first section of the intake passage and a pressure in a second section of the intake passage, the first and second sections separated by the air intake throttle. In some embodiments, the engine may include identical twin turbochargers, wherein compressors of the turbochargers communicate via a common intake passage downstream of the compressors.

The technical result of implementing this system is reducing the amount of EGR containing CRV recirculation flow that may enter the air intake passage. Engine compartmental restrictions may not allow for a larger air intake passage that could absorb a greater volume of CRV recirculation backflow. It may thus be possible to extend the life of an air filter disposed in the air intake passage that could otherwise be subject to premature failure from contaminants found in EGR contained in the CRV recirculation flow.

The systems depicted in FIGS. 1 and 2 and the method shown in FIG. 3 may also enable one or more methods. In one example, a method for an engine, comprising: during a first condition where a compressor recirculation valve is open: measuring a rate of an air flow at a compressor inlet; measuring a rate of an air flow through a compressor recirculation passage; measuring a rate of an EGR flow through a low-pressure EGR passage; determining a value for a margin based on current values for the rate of air flow at the compressor inlet, the rate of air flow through the compressor recirculation passage, and the rate of EGR flow through the low-pressure EGR passage; closing the compressor recirculation valve when the value for the margin is less than a threshold. In some examples, the first condition may include a tip-out condition. The margin may be further based on a volume of an intake passage that is upstream of the compressor recirculation passage.

The technical result of implementing this method is the prevention of large volume backflow events that may result in EGR containing gas damaging components disposed in the air intake, accomplished by continuous monitoring and adjusting of air pressure and air/gas flow rates in the air intake and EGR systems of the engine. This allows for LP-EGR systems to be implemented in vehicles with an engine compartment that restricts the distance between the CRV passage and the air filter.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling air flow through a compressor recirculation passage of a turbocharger in an internal combustion engine, comprising:
   during an engine operating condition;
      reducing air flow through the compressor recirculation passage by adjusting a valve based on an air capacity margin, the margin based on a rate of air flow at a compressor inlet, a rate of air flow through the compressor recirculation passage, a rate of exhaust gas recirculation (EGR) flow, a volume of an air intake passage that is upstream of the compressor recirculation passage, a pressure in a first section of the air intake passage, and a pressure in a second section of the air intake passage, the first and second sections separated by an air intake throttle.

2. The method of claim 1, where the action of reducing the air flow through the compressor recirculation passage includes closing a compressor recirculation valve coupled to the compressor recirculation passage.

3. The method of claim 2, where the action of reducing the air flow is responsive to a condition including a compressor recirculation valve in open condition.

4. The method of claim 1, where the action of reducing the air flow through the compressor recirculation passage based on the air capacity margin includes reducing the air flow through the compressor recirculation passage when the margin is less than a threshold.

5. The method of claim 4, further comprising: the action of reducing the air flow through the compressor recirculation passage until the margin increases above the threshold.

6. A method for controlling air flow through a compressor recirculation passage of a turbocharger in an internal combustion engine, comprising:
   during an engine operating condition;
      reducing air flow through the compressor recirculation passage by adjusting a valve based on an air capacity margin, the margin based on a rate of air flow at a compressor inlet, a rate of air flow through the compressor recirculation passage, a rate of exhaust gas recirculation (EGR) flow, a volume of an air intake passage that is upstream of the compressor recirculation passage, a pressure in a first section of the air intake passage, and a pressure in a second section of the air intake passage, the first and second sections separated by an air intake throttle, where reducing air flow through the compressor recirculation passage includes closing a compressor recirculation valve coupled to the compressor recirculation passage, and where the reducing air flow is responsive to a condition including a compressor recirculation valve opening condition and a tip-out condition.

7. A system for an engine, comprising:
   a turbocharger including a compressor arranged in an intake passage and a turbine arranged in an exhaust passage;
   a low-pressure exhaust gas recirculation (EGR) system including an EGR passage coupling the exhaust passage with the intake passage upstream of the compressor;
   a compressor recirculation passage coupling the intake passage downstream of the compressor with the intake passage upstream of the compressor;
   a compressor recirculation valve (CRV) arranged in the compressor recirculation passage; and
   a controller having instructions encoded in a non-transitory computer-readable medium to reduce air flow through the compressor recirculation passage via the CRV based on a margin, the margin based on a difference between a rate of air flow at a compressor inlet and a sum of a rate of air flow through the compressor recirculation passage plus a rate of EGR flow through the EGR passage.

8. The system of claim 7, where the action of reducing the air flow through the compressor recirculation passage based on the margin includes reducing air flow through the compressor recirculation passage when the margin is less than a threshold.

9. The system of claim 8, where the controller has further instructions to reduce the air flow through the compressor recirculation passage until the margin increases above the threshold.

10. The system of claim 7, where the margin is further based on a volume of the intake passage that is upstream of the compressor recirculation passage.

11. The system of claim 7, where the intake passage further comprises an air intake throttle.

12. The system of claim 7, wherein the engine includes identical twin turbochargers, and wherein compressors of the turbochargers communicate via a common intake passage downstream of the compressors.

13. The system of claim 7, where the action of reducing the air flow through the compressor recirculation passage includes closing the CRV.

14. The system of claim 11, where the margin is further based on a pressure in a first section of the intake passage and a pressure in a second section of the intake passage, the first and second sections separated by the air intake throttle.

15. A method for an engine, comprising:
during a tip-out condition where a compressor recirculation valve is open:
based on at least one sensor,
measuring a rate of an air flow at a compressor inlet;
measuring a rate of an air flow through a compressor recirculation passage;
measuring a rate of an exhaust gas recirculation (EGR) flow through a low-pressure EGR passage
determining a value for a margin based on current values for the rate of the air flow at the compressor inlet, the rate of the air flow through the compressor recirculation passage, and the rate of EGR flow through the low-pressure EGR passage, wherein the margin is a capacity of an air induction system to accept compressor recirculation valve (CRV) backflow without fouling an air filter; and
closing the compressor recirculation valve via a controller when the value for the margin is less than a threshold.

16. The method of claim 15, where the margin is further based on a volume of an intake passage that is upstream of the compressor recirculation passage.

* * * * *